UNITED STATES PATENT OFFICE.

CHARLES WALPUSKI, OF NEW YORK, ASSIGNOR TO THE EAGLE PENCIL COMPANY OF NEW YORK, N. Y.

COMPOSITION FOR PENCIL-LEADS AND CRAYONS.

SPECIFICATION forming part of Letters Patent No. 328,366, dated October 13, 1885.

Application filed March 19, 1885. Serial No. 159,484. (No specimens.)

*To all whom it may concern:*

Be it known that I, CHARLES WALPUSKI, of the city, county, and State of New York, have invented a certain new and useful Improvement in Compositions for Pencil-Leads and Crayons, of which the following is a specification.

The object of this invention is to produce a pencil-lead or crayon the marks made by which will change color as soon as they are dampened—as, for instance, a pencil the marks made by which will in the first instance be blue, but will as soon as dampened, *e. g.*, in the copying-press, become red.

In making a lead or crayon of this kind I make use of two colors, one of which may be called the "writing-color" and the other the "copying-color." By the first-named color is intended that color which appears when the mark is made. By the last-named color is intended that color which appears as soon as the mark is dampened. Of these two colors the writing-color is predominant in quantity in the composition, and the two are taken in connection with a suitable quantity of a base—such as potter's clay—and a binding medium or gum—such, for instance, as gum-tragacanth.

To produce the effect desired, the writing-color before being mixed with the other ingredients is subjected to a preliminary treatment with sulphuric acid and oxalic acid.

To a better understanding of my invention, I will describe in detail the manner in which I make a pencil-lead or crayon which will write blue and copy red.

I prefer to use indigo as the blue color. It is preliminarily prepared as follows: I mix and dissolve the color in Nordhauser sulphuric acid, taking ten parts, by weight, of the acid to one part of indigo, and allow the mixture to remain for, say, forty-eight hours, in a room heated to about 55° centigrade. I then thin this mass gradually with one hundred parts of water, and then while filtering the same add ten per cent. of oxalic acid. This mixture is evaporated and reduced to a paste, or it may be dried down to a powder, according to circumstances. Paris blue or similar colors I treat in about the same way; but as these colors are often adulterated with foreign substances which do not suit my purpose care should be taken to examine them closely, in order to determine the percentage of oxalic acid to be added. The red colors which I use are extracts of Fernambuco and red wood, with the addition of a solution of oxide of tin and ammonia free from iron, imitation vermillion, red naphthaline colors, eosene, and other red aniline colors, &c. The aniline colors are to be preferred on the whole. One formula for the composition which gives good results is as follows: Eosene, ten pounds; indigo, prepared as above described, thirty pounds; potter's clay, ten pounds; gum-tragacanth, as much as necessary to impart the desired consistency—say one hundred and twenty-five grams for fifty pounds of the composition. These ingredients are thoroughly mixed together, and are brought to the condition of a smooth homogeneous plastic or pasty mass. The leads or crayons are pressed therefrom into the desired shape, then thoroughly dried, according to the practice obtaining usually in the manufacture of colored pencil-leads or crayons, and after they are dried they are immersed in melted stearine at a temperature of about from 80° to 90° centigrade. This completes the process.

The lead or crayon thus produced is one which will give a blue mark, which mark will change to red as soon as dampened.

If the copying-color be an aniline color, as it is in the instance given, the blue marks made will yield an excellent red copy in the copying-press. In other words, the pencil will mark blue and copy red.

The degree of hardness of the leads can of course be regulated by varying the proportion of clay or gum, or both, as well known to those acquainted with the art to which my invention relates.

The colors employed as the writing-color and the copying-color may also vary.

Having described my invention and the manner in which it may be carried into practical effect, what I claim, and desire to secure by Letters Patent, is as follows:

1. A pencil-lead or crayon in which the coloring-matter is composed of two distinct and different colors, substantially as hereinbefore described, one of which colors appears when a mark is made, and the other of which appears when the mark is dampened.

2. A composition for pencil-leads and crayons, consisting of a base—such as potter's clay—a binding medium, and two distinct colors—a writing-color and a copying-color—these ingredients being prepared and combined substantially as hereinbefore set forth.

3. A composition for writing or marking purposes, consisting of indigo prepared substantially as described, and eosene or other red color, in combination with a base and a binding medium, substantially as hereinbefore set forth.

In testimony whereof I have hereunto set my hand this 17th day of March, 1885.

CHARLES WALPUSKI.

Witnesses:
S. BRAISTED,
JOE W. SWAINE.